United States Patent [19]

Hildebrand et al.

[11] 4,179,683

[45] Dec. 18, 1979

[54] METHOD AND APPARATUS FOR ENERGIZING AN ARRAY OF ACOUSTIC TRANSDUCERS TO ELIMINATE GRATING LOBES

[75] Inventors: B. Percy Hildebrand; Gerald J. Posakony, both of Richland, Wash.

[73] Assignee: Electric Power Research Institute, Inc., Palo Alto, Calif.

[21] Appl. No.: 871,157

[22] Filed: Jan. 23, 1978

[51] Int. Cl.[2] ........................ H04B 1/02; H04B 11/00

[52] U.S. Cl. ............................... 367/138; 343/100 LE

[58] Field of Search ................ 343/100 LE; 340/3 A, 340/3 R, 9, 5 R, 15

[56] References Cited

U.S. PATENT DOCUMENTS

| | | | |
|---|---|---|---|
| 2,768,364 | 10/1956 | Camp | 340/9 |
| 2,837,728 | 6/1958 | Schuck | 340/9 |
| 3,135,944 | 6/1964 | Ehrlich | 340/9 |
| 3,182,325 | 5/1965 | Blume | 343/100 LE |
| 3,478,309 | 11/1969 | Massa, Jr. | 340/9 |
| 4,045,800 | 8/1977 | Tang et al. | 343/100 LE |
| 4,065,748 | 12/1977 | Maguer et al. | 340/3 A |

*Primary Examiner*—Richard A. Farley
*Attorney, Agent, or Firm*—Flehr, Hohbach, Test, Albritton & Herbert

[57] ABSTRACT

Method and apparatus for energizing an array of acoustic transducer elements to eliminate grating lobes. The apparatus includes a first subarray of N transducer elements arranged along an axis. The apparatus also includes a second subarray of N+1 transducer elements arranged along a second axis parallel to the first axis. One subarray is energized to propagate an acoustic beam having odd grating lobes with positive amplitude and the other subarray is energized to propagate an acoustic beam having odd grating lobes with negative amplitude. The two subarrays are disposed so that the radiated acoustic beams combine together and the odd grating lobes cancel each other.

10 Claims, 7 Drawing Figures

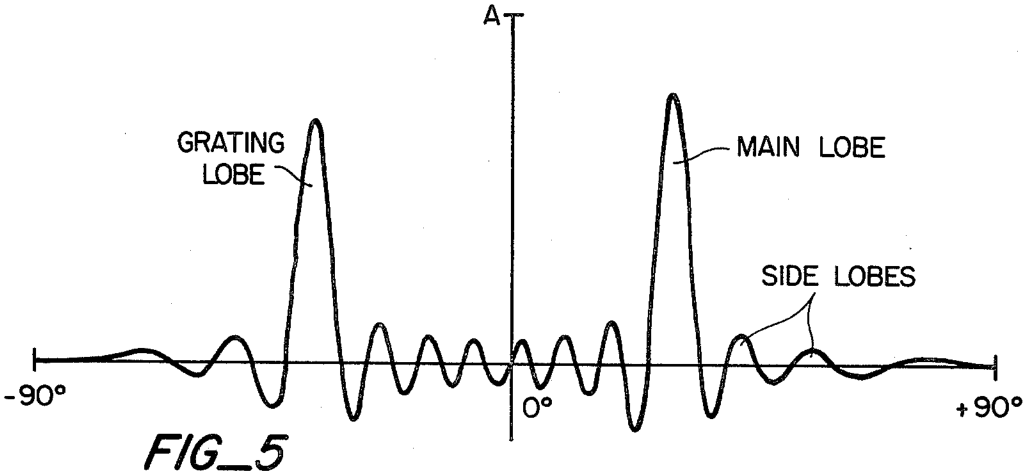
FIG_5
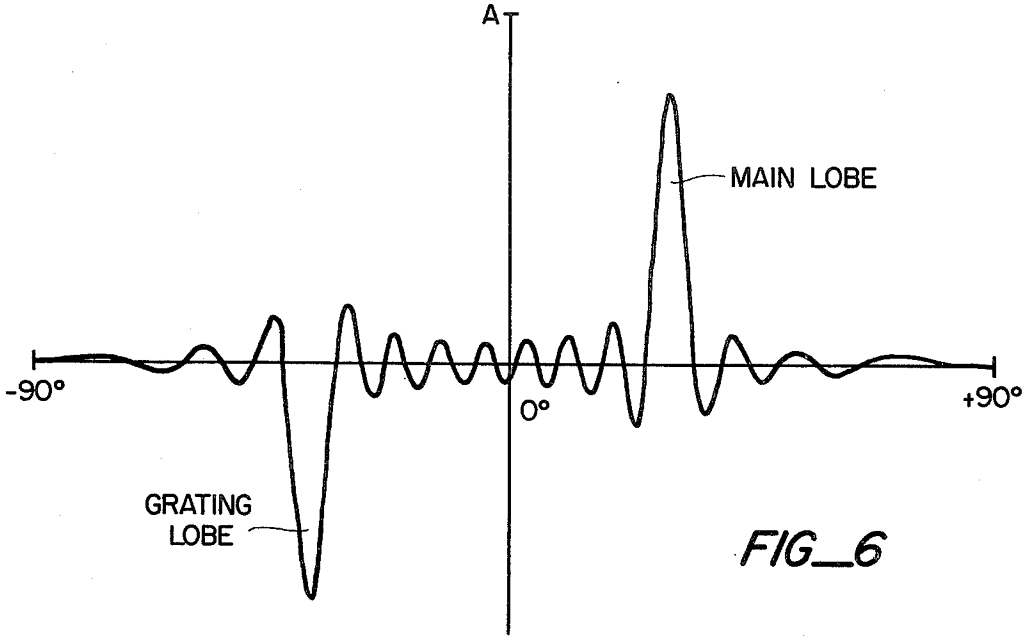
FIG_6
FIG_7
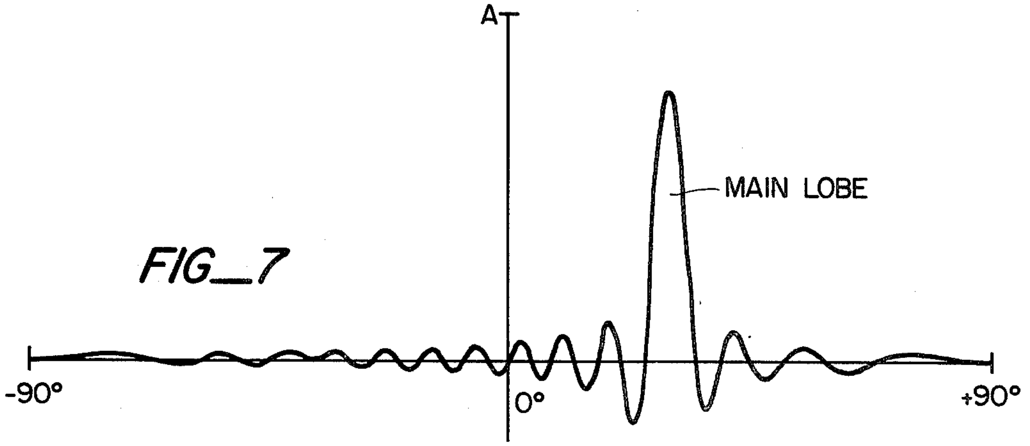

METHOD AND APPARATUS FOR ENERGIZING AN ARRAY OF ACOUSTIC TRANSDUCERS TO ELIMINATE GRATING LOBES

BACKGROUND OF THE INVENTION

This invention generally relates to the construction and operation of acoustic transducer arrays and, more particularly, to the elimination of the odd grating lobes propagated from such arrays.

When a plurality of transducer elements are arranged in a grating-type array and are energized to propagate a steerable acoustic beam, the beam includes a main lobe, a plurality of small side lobes and one or more grating lobes. The grating lobes originate from the acoustic waves that combine along various axes that differ from the axis of the main lobe. Grating lobes are present in the acoustic beams propagated from nearly all linear arrays and normally contain substantial energy.

Grating lobes present a special problem in the technology of acoustic wave imaging because each grating lobe returns a signal that is difficult to distinguish from the main lobe. Normally the side lobes of the beam are of small size and can be eliminated by known signal processing techniques. The grating lobes, however, can have dimensions comparable to the main lobe. Thus, both the grating lobe and the main lobe can give a comparable reflection from the same object of interest.

In the fields of radar and sonar technology grating lobes have been eliminated through various signal processing techniques. In one application the array was pulsed with signals of constant amplitude and the return echo received by the array was mathematically weighted to amplify the amplitude of the center of the return signal. In another application grating lobes were eliminated by randomly spacing the transducer elements along the array. Random spacing eliminated the interference which causes grating lobes but in turn the amount of energy either transmitted or received by the array was reduced. Also, grating lobes have been reduced by driving an array with signals that have a large amplitude at the center of the array and smaller amplitudes at the ends of the array. Although this technique can reduce grating lobes, the main lobe propagated from such an array tends to have an expanded width and becomes fatter. In short there has herefore been no satisfactory solution to the problem of grating lobes that did not cause other effects that seriously degraded the operation of the array.

OBJECTS AND SUMMARY OF THE INVENTION

It is an object of the present invention to provide an array of transducer elements that can eliminate odd grating lobes.

It is another object of the present invention to energize an acoustic array in a manner to eliminate odd grating lobes.

A further object of the present invention is to reduce the number of transducer elements required in an array while maintaining comparable performance.

Still another object of the present invention is to eliminate the artifacts from the images generated in an ultrasonic imaging system.

The foregoing and other objects are achieved by a method and apparatus for energizing an array of acoustic transducers including a first subarray of N transducer elements and a second subarray of N+1 transducer elements. The term "N" is intended to signify any real positive number. The two subarrays are energized so that an acoustic beam having odd grating lobes with negative amplitude is propagated from one subarray and an acoustic beam having odd grating lobes with positive amplitude is propagated from the second subarray. The two subarrays are positioned so that the acoustic beams are combined together and the odd grating lobes cancel each other.

BRIEF DESCRIPTION OF THE DRAWINGS

FIG. 5 is a graph in rectangular coordinates of the amplitude of the acoustic beam propagated from a linear subarray having an even number of elements. This beam has a grating lobe with a positive amplitude.

FIG. 6 is a graph in rectangular coordinates of the amplitude of the acoustic beam propagated from a linear subarray having an odd number of elements. This beam has a grating lobe with a negative amplitude.

FIG. 7 is a graph in rectangular coordinates of the sum of the two acoustic beams illustrated in FIGS. 5 & 6. This graph demonstrates that when the two acoustic beams are combined together, the grating lobes cancel each other.

Description of the Preferred Embodiments

Figure 3:
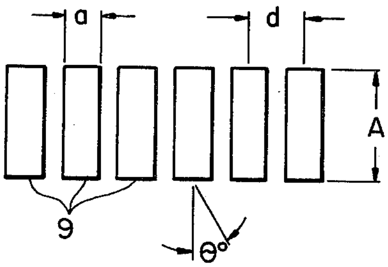
FIG. 3 is a diagram of one tier of the elements of FIG. 1 identifying each dimension.

FIG. 3 illustrates an array of transmitting transducer elements 9 each having a height "A", a width "a" and a center to center spacing "d". If this array has N rectangular radiating elements, where N is any real positive number, and if these elements are energized in phase, then the power of the ultrasonic far-field measured on a plane perpendicular to the plane of the drawing and bisecting the array of elements is:

$$/F(\theta)/^2 = \frac{\sin^2(\frac{\pi a}{\lambda}\sin\theta)}{(\frac{\pi a}{\lambda})^2\sin^2\theta}\cdot\frac{\sin^2[\frac{N\pi d}{\lambda}(\sin\theta - \sin\theta o)]}{N^2\sin^2[\frac{\pi d}{\lambda}(\sin\theta - \sin\theta o)]}, \quad \text{Eq. 1}$$

Where $\xi$ = wavelength,

N = number of elements, $\theta$ = angle at which the power is measured, and $\theta o$ = angle to which the array is steered.

The array of Fig. 3 can be energized to radiate a shaped acoustic beam that can be electronically steered along any desired axis. Array steering is accomplished by introducing a linear time delay between successive elements in the array. For example, the array can be energized to propagate an acoustic beam having a main lobe directed along an axis at angle $\theta$ when the elements in the array are energized in the time sequence:

$$t_n = t(nd) = (N - n)\frac{d}{v}\sin\theta, \quad \text{Eq. 2}$$

Where v = velocity of propagation $n = n^{th}$ array element

It should be noted from equation 1 that the second quotient has a periodicity. The quotient becomes unity at the angles:

$$\sin\theta = \sin\theta o \pm \frac{k\lambda}{d}, \quad \text{Eq. 3}$$

where k is an integer.

The principle or desired maximum occurs when $k=0$; the other maxima are undesirable if they occur at angles $|\theta| \leq 90°$. Eq. 3 defines the appearance of grating lobes which are these other maxima.

FIG. 3 illustrates a typical grating lobe. If the grating lobe occurs in the same half-space as the main lobe, then erroneous signals are generated. These erroneous signals occur because the grating lobe sweeps with the main lobe when the acoustic beam is electronically steered. If the beam is used to image an object of interest, the object returns two signals. One signal is the reflection of the main lobe and the other is the reflection of the grating lobe. When the two reflections are displayed, it appears as though there are two objects separated by an angle of $\theta° + \phi°$.

Figure 1:
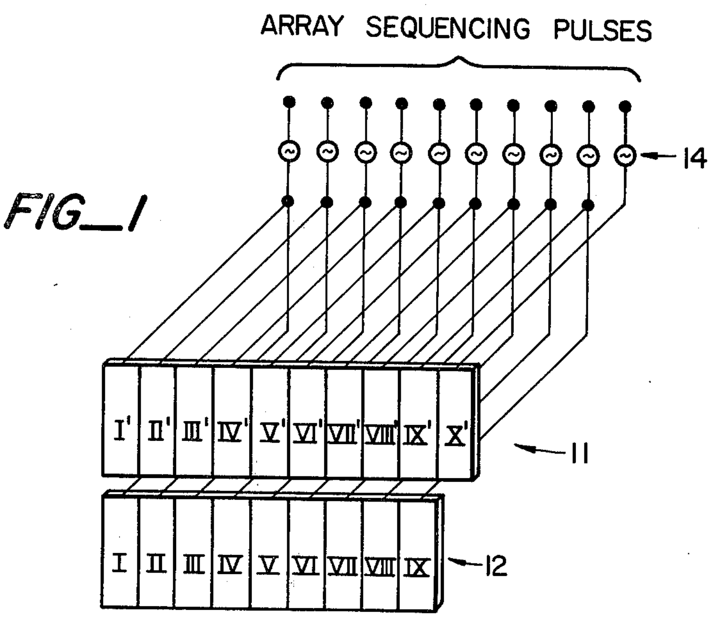
FIG. 1 illustrates two linear subarrays of acoustic wave transducer elements in accordance with the present invention.
Figure 2:
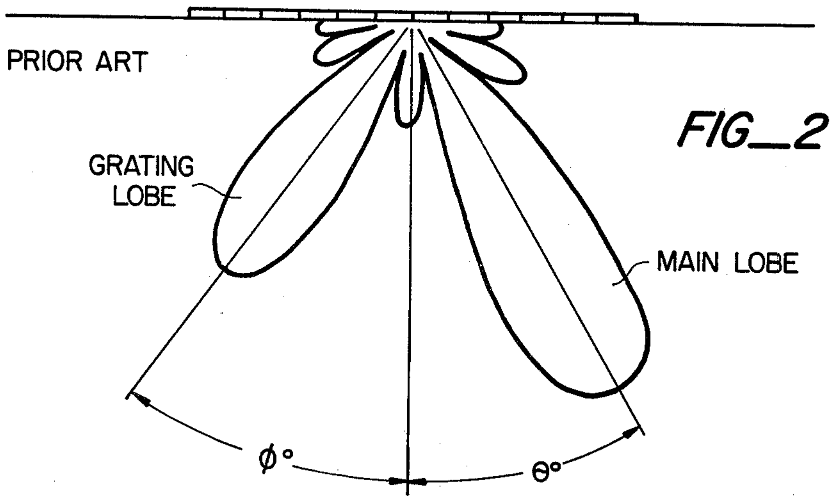
FIG. 2 is a graph in polar coordinates of the amplitude of the acoustic beam propagated from a conventional linear array.

FIG. 1 illustrates an array of transducers that eliminates grating lobes. The array consists of two tiers or subarrays 11, 12. The lower subarray 12 contains N elements and the upper subarray 11 contains N+1 elements. Each element is fabricated from conventional transducer materials and has an elongate, generally rectangular shape. The elements in each subarray are arranged along a longitudinal axis (not shown) and the two axes are parallel with each other and spaced one above the other. The two subarrays are contiguous so that the acoustic beams propagated from the subarrays combine as described below.

The array of transducer elements 11, 12, FIG. 1 is driven by a plurality of pulsers 14 that are sequenced by a shift register (not shown) of known construction. The pulsers 14 and the shift register are further described in the co-pending application entitled "Linear Transducer Array and Method for Both Pulse-Echo and Holographic Acoustic Imaging" by Posakony, Hildebrand, and Davis, Ser. No. 816,095, filed July 15, 1977.

The array is constructed so that for every element in the lower array there is a corresponding element in the upper array. Each pair of elements is shorted together and is driven simultaneously by a pulser 14. The remaining element in the upper array (x') is individually driven by an additional pulser.

In operation the shift register (not shown) generates a sequence of timing pulses that trigger the pulsers 14. The pulsers in turn drive the transducer elements 9. Since the two subarrays 11, 12 are contiguous and the corresponding elements in each subarray are shorted together, the subarrays propagate two acoustic beams that combine together. Each acoustic beam has a main lobe and a grating lobe with either a positive or a negative amplitude. The shift register steers the two beams by inserting appropriate time delays between the timing pulses. These time delays are described by Eq. 2. The operation and steering of a two tiered array is further described in the co-pending application cited above.

For the array illustrated in FIG. 1 the power in the ultrasonic far-field is given by:

$$/F(\theta)/^2 = \frac{\sin^2(\frac{\pi a}{\lambda}\sin\theta)}{(\frac{\pi a}{\lambda})^2\sin^2\theta} \cdot \frac{\left|\frac{1}{N}\sin[\frac{N\pi d}{\lambda}(\sin\theta - \sin\theta o)] + \frac{1}{(N+1)}\sin[\frac{(N+1)\pi d}{\lambda}(\sin\theta - \sin\theta o)]\right|^2}{\sin^2[\frac{\pi d}{\lambda}(\sin\theta - \sin\theta o)]} \quad \text{Eq. 4}$$

Where A is the combined height of the two subarrays 11, 12, FIG. 1 and d is the center-to-center spacing between each of the elements.

When N is much larger than 1, equation 4 becomes:

$$/F(\theta)/^2 = \frac{\sin^2(\frac{\pi a}{\lambda}\sin\theta)}{(\frac{\pi a}{\lambda})^2\sin^2\theta} \cdot \frac{\sin^2[\frac{(2N+1)\pi d}{2\lambda}(\sin\theta - \sin\theta o)]\cos^2[\frac{\pi d}{2\lambda}(\sin\theta - \sin\theta o)]}{4N^2\sin^2[\frac{\pi d}{\lambda}(\sin\theta - \sin\theta o)]} \quad \text{Eq. 5}$$

This equation indicates that for any angle $\theta < 90°$, the array of FIG. 1 has only one principle maximum, i.e. the main lobe. This array cancels all of the odd grating lobes (K odd) because one of the subarrays propagates an acoustic beam having odd grating lobes with positive amplitude and the other subarray propagates odd grating lobes with negative amplitude. When these two acoustic beams combine, the odd grating lobes from each subarray cancel each other out.

By way of example, FIG. 5 is a graph of the relative amplitude of the beam propagated from a subarray with respect to the angle $\theta$. The subarray in the graph has sixteen elements and the main lobe is steered to an angle of 30°. The width of each element (a) is forty-two mils, the center-to-center separation of the elements (d) is fifty mils and the wave length ($\lambda$) is fifty-five mils (longitudinal in steel at 2.3 $MH_z$). The grating lobe has a positive amplitude.

FIG. 6 is a similar graph of the acoustic beam propagated from an array having the same size elements and spacing as the array of FIG. 5. In FIG. 6 the subarray has fifteen elements and thus the graph contains a grating lobe having a negative amplitude.

When the acoustic beams propagated from the two subarrays, FIGS. 5 & 6, are combined together, the grating lobes cancel each other out. The combined acoustic beam is illustrated in FIG. 7.

It should be understood that the above described array and sequencing technique removes only the odd order (K odd) grating lobes. However, of all the grating lobes the largest and most predominant are the first order ($K = \pm 1$) lobes. It is this lobe that produces most of the artifacts in imaging displays. Since the method and apparatus described herein eliminates the first order grating lobe and since it is well known in the art to construct acoustic arrays wherein only the first order grating lobe is produced, the present invention has the capability of propagating a steerable main lobe that is accompanied by virtually no other lobes.

Figure 4:
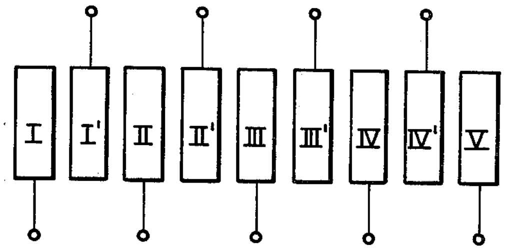
FIG. 4 is an alternative embodiment of the transducer array of FIG. 1.

It should be understood that the two subarrays 11, 12, FIG. 1 are positioned so that the acoustic beam propagated from each subarray combines and cancels out the grating lobes. In FIG. 1 the two subarrays are positioned one above the other in adjacent relationship. The present invention also contemplates the interleaving of two subarrays as illustrated in FIG. 4. In this configuration one subarray contains N elements and the other contains n+1 elements as illustrated by the primed and unprimed numbers. The two subarrays are energized in the same manner as described above. In addition, although only linear arrays are described in the preferred embodiment, the invention is not intended to be limited solely to such configurations.

Thus, although the best modes contemplated for carrying out the present invention have been herein shown and described, it will be apparent that modification and variation may be made without departing from what is regarded to be the subject matter of the invention.

What is claimed is:

1. A method for energizing an array of acoustic transducer elements to eliminate grating lobes, comprising the steps of:

(a) propagating a first acoustic beam by energizing a first subarray of transducer elements, said first acoustic beam having odd grating lobes with a positive amplitude;

(b) propagating a second acoustic beam by energizing a second subarray of transducer elements, said second acoustic beam being physically independent from the first beam and having odd grating lobes with a negative amplitude, said first and second subarrays being substantially adjacent and said first and second acoustic beams substantially co-existing in space; and (c) combining the first and second co-existing acoustic beams together so that the odd grating lobes from one subarray cancel the odd grating lobes from the other subarray.

2. The method of claim 1 wherein the step of propagating said first acoustic beam includes energizing a first linear subarray having N elements where N is any real, positive number and the step of propagating said second acoustic beam includes energizing a second linear subarray having N+1 elements.

3. The method of claim 2 wherein the power of the first and second acoustic beams is defined by:

$$/F(\theta)/^2 = \frac{\sin^2\left(\frac{\pi a}{\lambda}\sin\theta\right)}{\left(\frac{\pi a}{\lambda}\right)^2\sin^2\theta} \cdot \frac{\left|\frac{1}{N}\sin\left[\frac{N\pi d}{\lambda}(\sin\theta - \sin\theta o)\right] + \frac{1}{(N+1)}\sin\left[\frac{(N+1)\pi d}{\lambda}(\sin\theta - \sin\theta o)\right]\right|^2}{\sin^2\left[\frac{\pi d}{\lambda}(\sin\theta - \sin\theta o)\right]}$$

where $\theta$=angle at which the power is measured a=width of a transducer element $\lambda$=wavelength d=center-to-center spacing between each element $\theta o$=angle to which the array is steered.

4. The method of claim 3 wherein the power of the first and second acoustic beams is defined by:

$$/F(\theta)/^2 = \frac{\sin^2\left(\frac{\pi a}{\lambda}\sin\theta\right)}{\left(\frac{\pi a}{\lambda}\right)^2\sin^2\theta} \cdot \frac{\sin^2\left[\frac{(2N+1)\pi d}{2\lambda}(\sin\theta - \sin\theta o)\right]\cos^2\left[\frac{\pi d}{2\lambda}(\sin\theta - \sin\theta o)\right]}{4N^2\sin^2\left[\frac{\pi d}{\lambda}(\sin\theta - \sin\theta o)\right]}$$

where N>>1.

5. The method of claim 1 wherein the steps of energizing said subarrays include steering said two co-existing beams together to predetermined angles of transmission $\theta$.

6. An array of acoustic wave transducer elements for eliminating grating lobes, comprising:

(a) a first subarray of N transducer elements where N is any real positive number, said elements being arranged along a first axis and adapted for propagating a steerable acoustic beam with odd grating lobes having one of either a positive or a negative amplitude;

(b) a second subarray of N+1 transducer elements arranged along a second axis parallel to the first axis, said elements being adapted for propagating a steerable acoustic beam with odd grating lobes having one of either a positive or a negative amplitude but opposite from the corresponding grating lobes of the first subarray; and (c) means for energizing said subarrays so that a physically independent, steerable acoustic beam is propagatable from each subarray, said subarrays being positioned substantially adjacent so that when the arrays are energized, the two independent acoustic beams propagated from the two subarrays substantially co-exist, combine and cancel said odd grating lobes.

7. The array of claim 6 wherein the elements of the first subarray are contiguous and are disposed adjacent to corresponding elements in the second subarray, forming a two tiered linear array, said first and second axes being both parallel and spaced one above the other.

8. The array of claim 6 wherein the elements of the first subarray are interleaved between the elements of the second subarray, forming a single tiered linear array, said first and second axes being substantially coexistent.

9. The array of claim 6 wherein the elements in said first and second subarrays each have an elongate rectangular shape.

10. An array of acoustic wave transducer elements for eliminating grating lobes, comprising:

(a) a first subarray of N transducer elements where N is any real positive number, said elements being arranged along a first axis and adapted for propagating a steerable acoustic beam with odd grating lobes having one of either a positive or a negative amplitude;

(b) a second subarray of N+1 transducer elements arranged along a second axis parallel to the first axis, said elements being adapted for propagating a steerable acoustic beam with odd grating lobes having one of either a positive or a negative amplitude but opposite from the corresponding grating lobes of the first subarray, the 1, 2, 3, . . . N numbered elements in the first subarray being each individually connected to the corresponding 1, 2, 3, . . . N numbered elements in the second subarray; and (c) means for energizing the corresponding numbered elements in said subarrays in pairs, the N+1 numbered element being individually energized, so that a steerable acoustic beam is propagatable from each subarray, said subarrays being positioned substantially adjacent so that when energized said acoustic beams propagated therefrom combine and cancel said odd grating lobes.

* * * * *